(12) United States Patent
Tian et al.

(10) Patent No.: US 10,318,270 B2
(45) Date of Patent: Jun. 11, 2019

(54) METHOD FOR UPGRADING FIRMWARE OF ADAPTER, APPARATUS, AND SYSTEM THEREOF

(71) Applicant: Guangdong Oppo Mobile Telecommunications Corp., Ltd., Dongguan (CN)

(72) Inventors: Chen Tian, Dongguan (CN); Jialiang Zhang, Dongguan (CN); Jun Zhang, Dongguan (CN); Fuchun Liao, Dongguan (CN)

(73) Assignee: GUANGDONG OPPO MOBILE TELECOMMUNICATIONS CORP, LTD., Dongguan, Guangdong (CN)

( * ) Notice: Subject to any disclaimer, the term of this patent is extended or adjusted under 35 U.S.C. 154(b) by 121 days.

(21) Appl. No.: 15/308,364

(22) PCT Filed: Sep. 24, 2015

(86) PCT No.: PCT/CN2015/090623
§ 371 (c)(1),
(2) Date: Nov. 2, 2016

(87) PCT Pub. No.: WO2017/049554
PCT Pub. Date: Mar. 30, 2017

(65) Prior Publication Data
US 2017/0269922 A1  Sep. 21, 2017

(51) Int. Cl.
*G06F 8/65* (2018.01)
*G06F 13/38* (2006.01)
(Continued)

(52) U.S. Cl.
CPC .............. *G06F 8/65* (2013.01); *G06F 13/385* (2013.01); *G06F 13/4286* (2013.01); *G06F 16/1794* (2019.01)

(58) Field of Classification Search
CPC ...... G06F 8/65; G06F 13/385; G06F 13/4286; G06F 16/1794
See application file for complete search history.

(56) References Cited

U.S. PATENT DOCUMENTS 6,151,653 A * 11/2000 Lin ..................... G06F 13/4009
710/305
8,907,216 B2 * 12/2014 Backus .................. H02G 11/00
174/72 A
(Continued)

FOREIGN PATENT DOCUMENTS

CN       1752933 A      3/2006
CN      102063318 A     5/2011
(Continued)

OTHER PUBLICATIONS

SIPO, First Office Action for CN Application No. 201580012950, dated Dec. 27, 2018.

*Primary Examiner* — Eric T Oberly
(74) *Attorney, Agent, or Firm* — Hodgson Russ LLP (57) ABSTRACT

A method for upgrading firmware of an adapter, an apparatus, and a system are provided. The method includes receiving, by an adapter, an upgrade file in accordance with a Universal Asynchronous Receiver/Transmitter (UART) format, which is transferred by a converter, via a data line of a charging interface of the adapter, where the converter is configured to convert the upgrade file in accordance with a Universal Serial Bus (USB) in a personal computer (PC) into the upgrade file in accordance with the UART format for transmitting the upgrade file in accordance with the UART format to the adapter; and processing, by a microcontroller unit (MCU), the upgrade file in accordance with the UART format for upgrading the firmware of the adapter when the adapter is in an upgrading mode, where the MCU is built in the adapter.

9 Claims, 4 Drawing Sheets

100

An adapter receives the upgrade file in accordance with a UART format, which is transferred by a converter, via a data line of a charging interface of the adapter, where the converter is configured to convert the upgrade file in accordance with a Universal Serial Bus (USB) format in the PC into the upgrade file in accordance with the UART format, and is configured to transmit the upgrade file in accordance with the UART format to the adapter. ∿ S110

A MCU built in the adapter processes the upgrade file in accordance with the UART format for upgrading the firmware of the adapter when the adapter is in an upgrading mode ∿ S120

(51) Int. Cl.
*G06F 13/42* (2006.01)
*G06F 16/178* (2019.01)

(56) References Cited

U.S. PATENT DOCUMENTS

| | | | |
|---|---|---|---|
| 2003/0057922 A1 | 3/2003 | Odaohhara et al. | |
| 2009/0144455 A1* | 6/2009 | Chen | G06F 11/1433 710/8 |
| 2009/0240852 A1* | 9/2009 | Gou | G06F 13/385 710/63 |
| 2012/0005656 A1 | 1/2012 | Chuang | |
| 2013/0332542 A1 | 12/2013 | Foo et al. | |
| 2014/0070774 A1 | 3/2014 | Terlizzi | |
| 2014/0125131 A1 | 5/2014 | Lalitnuntikul et al. | |
| 2014/0244869 A1* | 8/2014 | Adrian | G06F 13/385 710/106 |
| 2016/0094061 A1 | 3/2016 | Terlizzi et al. | |

FOREIGN PATENT DOCUMENTS

| | | |
|---|---|---|
| CN | 202351904 U | 7/2012 |
| CN | 103309711 | 9/2013 |
| CN | 104239097 A | 12/2014 |
| CN | 104868573 A | 8/2015 |
| CN | 204557471 U | 8/2015 |
| TW | M329281 U | 3/2008 |
| TW | 201411395 A | 3/2014 |

\* cited by examiner

100

| An adapter receives the upgrade file in accordance with a UART format, which is transferred by a converter, via a data line of a charging interface of the adapter, where the converter is configured to convert the upgrade file in accordance with a Universal Serial Bus (USB) format in the PC into the upgrade file in accordance with the UART format, and is configured to transmit the upgrade file in accordance with the UART format to the adapter. | ∿ S110 |

| A MCU built in the adapter processes the upgrade file in accordance with the UART format for upgrading the firmware of the adapter when the adapter is in an upgrading mode | ∿ S120 |

METHOD FOR UPGRADING FIRMWARE OF ADAPTER, APPARATUS, AND SYSTEM THEREOF

CROSS-REFERENCE TO RELATED APPLICATIONS

This application is a 371 application filing of PCT International application serial no. PCT/CN2015/090623, filed Sep. 24, 2015. The entire disclosure of the above application is incorporated herein by reference.

BACKGROUND

Field

The present disclosure relates to a technical field of communication, and more particularly to a method for upgrading firmware of an adapter, an apparatus, and a system thereof.

Background

Since a conventional adapter may not be programmable, an operational function of the adapter lacks of flexibility. If a user desires to change the operational function of the adapter, it can only be changed by replacing hardware components of the adapter, thereby downgrading the performance and increasing manufacturing cost of the adapter.

An intelligent adapter, such as an adapter in accordance with a quick charge technique developed by OPPO Mobile Communications Co., Ltd., includes a microcontroller unit (MCU) for adjusting operation modes based on the adapter's statuses. For example, an MCU supports a programmable function and if the user desires to upgrade firmware of the adapter (e.g., upgrading the functionality of the adapter), it is required to download application programs to the MCU.

SUMMARY OF THE DISCLOSURE

Based on the above-mentioned drawbacks, one objective of the present disclosure is to provide a method for upgrading firmware of an adapter, an apparatus, and a system thereof for flexibly implementing the upgrading firmware of the adapter and reducing the manufacturing cost of adapter.

In a first aspect of a method for upgrading firmware of an adapter, the method includes receiving, by an adapter, an upgrade file in accordance with a Universal Asynchronous Receiver/Transmitter (UART) format, which is transferred by a converter, via a data line of a charging interface of the adapter, where the converter is configured to convert the upgrade file in accordance with a Universal Serial Bus (USB) format in a personal computer (PC) into the upgrade file in accordance with the UART format for transmitting the upgrade file in accordance with the UART format to the adapter; and processing, by a microcontroller unit (MCU), the upgrade file in accordance with the UART format for upgrading the firmware of the adapter when the adapter is in an upgrading mode, where the MCU is built in the adapter.

In at least one embodiment of the first aspect, when the adapter receives the upgrade file in accordance with the UART format, which is transferred by the converter, via the data line of the charging interface of the adapter, the method further includes setting, by the adapter, the data line of the charging interface as a UART mode; and receiving, by the adapter, the upgrade file in accordance with the UART format by the data line which is operated under the UART mode.

In at least one embodiment of the first aspect, when the adapter sets the data line of the charging interface to be operated under the UART mode, the method further includes decreasing, by the adapter, an output voltage of a bus-powered VBUS line when the adapter detects an output current of the bus-powered VBUS line in the charging interface and determines that the detected output current is greater than a first threshold current; and setting, by the adapter, the data line of the charging interface to be operated under the UART mode when the adapter detects the output voltage and determines that the detected output voltage decreases to a voltage value less than a second threshold voltage, and the output current is still greater than the first threshold current.

In at least one embodiment of the first aspect, when the adapter receives the upgrade file in accordance with the UART format, which is transferred by the converter, via the data line of the charging interface of the adapter, the method further includes sending, by the adapter, a request information to the converter for requesting the upgrade file in accordance with the UART format via the data line of the adapter such that the converter transfers the request information to the PC; and receiving, by the adapter, the upgrade file in accordance with the UART format, which is transferred by the converter, via the data line.

In at least one embodiment of the first aspect, the method further includes resending, by the adapter, the received upgrade file to the converter via the data line of the adapter such that the converter transfers the upgrade file to the PC to allow the PC to verify the upgrade file; receiving, by the adapter, an indication information fed back by the converter via the data line, where the PC sends the indication information to the converter for indicating that the upgrade file verification has been completed; and exiting, by the adapter, the upgrading mode of the adapter once the adapter receives the indication information.

In a second aspect of an adapter, the adapter includes a transmitting/receiving unit configured to receive the upgrade file in accordance with the UART format, which is transferred by a converter, via a data line of a charging interface of the adapter, where the converter is configured to convert the upgrade file in accordance with a USB in a PC into the upgrade file in accordance with the UART format, and is configured to transmit the upgrade file in accordance with the UART format to the adapter; and a processing unit configured to process the upgrade file in accordance with the UART format by an MCU for upgrading the firmware of the adapter when the adapter is in an upgrading mode, where the MCU is built in the adapter.

In at least one embodiment of the second aspect, the adapter includes the processing unit further configured to set the data line of the charging interface to be operated under a UART mode; and the transmitting/receiving unit further configured to receive the upgrade file in accordance with the UART format by the data line which is operated under the UART mode.

In at least one embodiment of the second aspect, the processing unit is further configured to decrease an output voltage of a bus-powered VBUS line when the processing unit detects an output current of the bus-powered VBUS line in the charging interface and determines that the detected output current is greater than a first threshold current; and set the data line of the charging interface to be operated under the UART mode when the processing unit detects the output voltage and determines that the detected output voltage decreases to a voltage value less than a second threshold voltage, and the output current is still greater than the first threshold current.

In at least one embodiment of the second aspect, the transmitting/receiving unit is further configured to send a request information to the converter for requesting the upgrade file in accordance with the UART format via the data line such that the converter transfers the request information to the PC; and receive the upgrade file in accordance with the UART format, which is transferred by the converter, via the data line.

In at least one embodiment of the second aspect, the adapter includes the transmitting/receiving unit further configured to resend the received upgrade file to the converter via the data line such that the converter transfers the upgrade file to the PC to allow the PC to verify the upgrade file, and the transmitting/receiving unit is further configured to receive an indication information fed back by the converter via the data line, where the PC sends the indication information to the converter for indicating that the upgrade file verification has been completed; and the processing unit further configured to exit the upgrading mode of the adapter once the adapter receives the indication information.

In a third aspect of a converter, the converter is configured to couple a data line of a charging interface in an adapter to a USB interface of a PC, and the converter includes a converting circuit for converting a signal in accordance with a USB format of the PC and a signal in accordance with a UART format of the adapter therebetween.

In at least one embodiment of the third aspect, the converter further includes a short circuit configured to couple a first terminal of the short circuit to a bus-powered VBUS line of a charging interface of the adapter, and configured to couple a second terminal of the short circuit to a grounding line (GND), where a value of a resistor less than a first threshold resistance is disposed between the first terminal and the second terminal.

In a fourth aspect of a system of upgrading firmware of an adapter, the system includes the adapter and a converter, where the converter is configured to couple a data line of a charging interface in an adapter to a USB interface of a PC, and the converter includes a converting circuit for converting a signal in accordance with a USB format of the PC and a signal in accordance with a UART format of the adapter therebetween; and the adapter includes a transmitting/receiving unit configured to receive an upgrade file in accordance with a UART format, which is transferred by a converter, via the data line of a charging interface of the adapter, where the converter is configured to convert the upgrade file in accordance with a USB format in a PC into the upgrade file in accordance with the UART format, and is configured to transmit the upgrade file in accordance with the UART format to the adapter; and a processing unit configured to process the upgrade file in accordance with the UART format by an MCU for upgrading the firmware of the adapter when the adapter is in an upgrading mode, where the MCU is built in the adapter.

In at least one embodiment of the fourth aspect, the system includes the processing unit further configured to set the data line of the charging interface as a UART mode; and the transmitting/receiving unit further configured to receive the upgrade file in accordance with the UART format by the data line which is operated under the UART mode.

In at least one embodiment of the fourth aspect, the system includes the converter further includes a short circuit configured to couple a first terminal of the short circuit to a bus-powered VBUS line of a charging interface of the adapter, and the short circuit is configured to couple a second terminal of the short circuit to a GND line, where a value of a resistor less than a first threshold resistance is disposed between the first terminal and the second terminal; and the processing unit of the adapter is further configured to decrease an output voltage of a bus-powered VBUS line when the processing unit detects an output current of the bus-powered VBUS line in the charging interface and determines that the output current is greater than a first threshold current; and configured to set the data line of the charging interface to be operated under the UART mode when the processing unit detects the output voltage and determines that the detected output voltage decreases to a voltage value less than a second threshold voltage, and the output current is still greater than the first threshold current.

In at least one embodiment of the fourth aspect, the transmitting/receiving unit is further configured to send a request information to the converter for requesting the upgrade file in accordance with the UART format via the data line such that the converter transfers the request information to the PC; and receive the upgrade file in accordance with the UART format, which is transferred by the converter, via the data line.

In at least one embodiment of the fourth aspect, the system includes the transmitting/receiving unit further configured to resend the received upgrade file to the converter via the data line such that the converter transfers the upgrade file to the PC to allow the PC to verify the upgrade file, and the transmitting/receiving unit is further configured to receive an indication information fed back by the converter via the data line, where the PC sends the indication information to the converter for indicating that the upgrade file verification has been completed; and the processing unit further configured to exit the upgrading mode of the adapter once the adapter receives the indication information.

Based on the above-mentioned embodiments, by downloading the upgrade file, which is transferred by the PC, to the MCU disposed in the adapter, the functions of MCU can be changed to adjust the operation modes of adapter for upgrading the firmware of the adapter. On the contrary, since conventional techniques may change the operation modes of adapter by replacing the hardware components of adapter, the present disclosure flexibly implements the upgrading firmware of the adapter and reduces the manufacturing cost of adapter.

BRIEF DESCRIPTION OF THE DRAWINGS

To describe the technical solutions of the present application more clearly, the accompanying drawings for illustrating at least one embodiment will be introduced briefly in the following. Apparently, the accompanying drawings in the following description are only some embodiments of the present application, and a person of ordinary skill in the art may obtain other drawings based on these accompanying drawings without creative efforts.

DETAILED DESCRIPTION OF THE PREFERRED EMBODIMENTS

The following embodiments refer to the accompanying drawings for exemplifying specific implementable embodiments of the present disclosure. It should be noted that the exemplary described embodiments are configured to describe and understand the present disclosure, but the present disclosure is not limited thereto.

It should be noted that an adapter in the present disclosure is an intelligent adapter equipped with a microcontroller unit (MCU).

It should also be noted that an upgrading firmware of the adapter is defined as adjustments of operation modes of the adapter. In detail, by downloading application codes to the MCU disposed in the adapter, the MCU is installed in accordance with corresponding functions therein. In the present disclosure, the data for upgrading the firmware of the adapter to be downloaded to the MCU are termed as upgrade file.

In at least one embodiment, the MCU receives the upgrade file by Universal Asynchronous Receiver/Transmitter (UART).

The present disclosure provides an upgrading solution to upgrade the adapter by a personal computer (PC).

Figure 1:
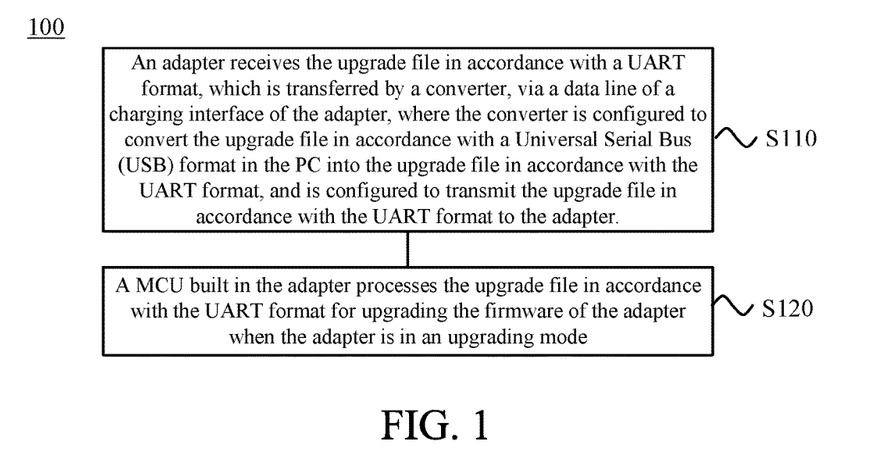
FIG. 1 is an illustrative flowchart of a method for upgrading firmware of an adapter according to one embodiment of the present disclosure.

FIG. 1 is an illustrative flowchart of a method 100 of upgrading firmware of an adapter according to one embodiment of the present disclosure. The method 100 includes the following blocks.

In block S110, the adapter receives the upgrade file in accordance with a UART format, which is transferred by a converter, via a data line of a charging interface of the adapter. The converter is configured to convert the upgrade file in accordance with a Universal Serial Bus (USB) format in the PC into the upgrade file in accordance with the UART format, and is configured to transmit the upgrade file in accordance with the UART format to the adapter.

In at least one embodiment, the adapter is a charge adapter for charging a terminal, such as a smartphone. The charge adapter includes a power interface for coupling to a charging power unit and a charging interface for coupling to the terminal, where the charging interface (e.g., a USB interface) includes the data line (e.g., two conductive wires in accordance with signals D+ and D− respectively), a bus-powered VBUS line and a grounding line (GND).

In at least one embodiment, the software application codes in the PC are configured to upgrade the adapter. A data output port of the PC is operated in a USB mode, which means that the output upgrade file corresponds to data in accordance with the USB format. The MCU built in the adapter receives the upgrade file by the UART interface. In other words, it is required to convert the upgrade file in accordance with the USB format, which is transferred by the PC, into the upgrade file in accordance with the UART format such that the MCU receives the upgrade file in accordance with the UART format via the UART interface and processes the upgrade file for upgrading the firmware of the adapter.

Figure 3:
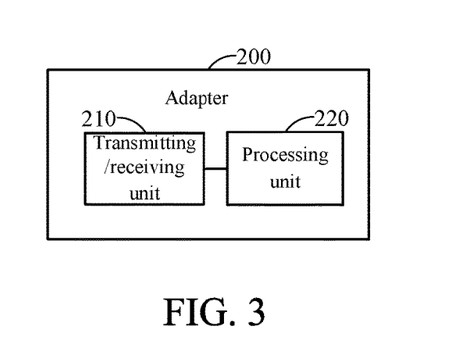
FIG. 3 is an illustrative block diagram of the adapter according to one embodiment of the present disclosure.
Figure 4:
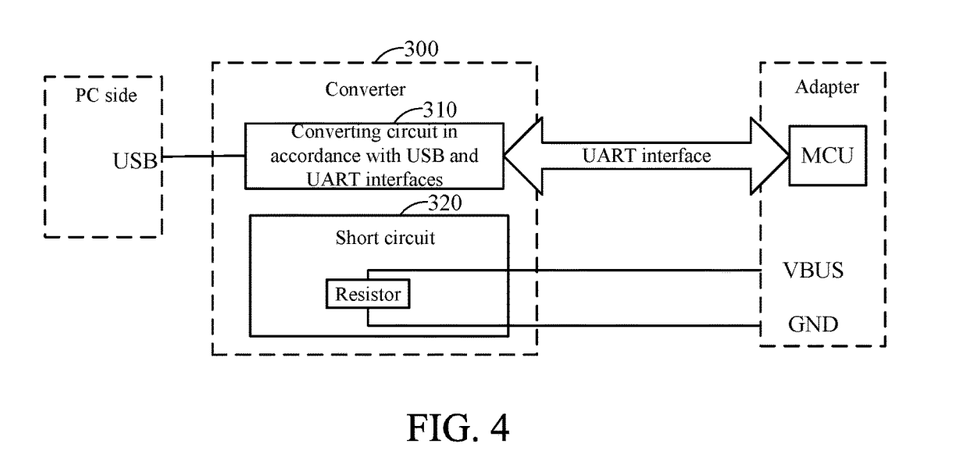
FIG. 4 is an illustrative block diagram of a converter according to one embodiment of the present disclosure.

In at least one embodiment, the converter is configured to make a communication between the PC and the adapter 200 and the converter 300 converts the data in accordance with USB format and the data in accordance with UART format therebetween, as depicted in FIGS. 3 and 4.

In block S120, the MCU built in the adapter processes the upgrade file in accordance with the UART format for upgrading the firmware of the adapter when the adapter is in an upgrading mode.

In at least one embodiment, by downloading the upgrade file, which is transferred by the PC, to the MCU disposed in the adapter, the functions of MCU can be changed to adjust the operation modes of adapter for upgrading the firmware of the adapter. On the contrary, since conventional techniques may change the operation modes of adapter by replacing the hardware components of adapter, the present disclosure flexibly implements the upgrading firmware of the adapter and reduces the manufacturing cost of adapter.

In block S110 of at least one embodiment, when the adapter receives the upgrade file in accordance with the UART format, which is transferred by the converter, via the data line of the charging interface of the adapter, the method further includes:

In block S111, the adapter sets the data line of the charging interface to be operated under a UART mode; and In block S112, the adapter receives the upgrade file in accordance with the UART format by the data line which is operated under the UART mode.

In detail, the data line of the charging interface of the adapter includes data line (e.g., two conductive wires in accordance with signals D+ and D− respectively) so that the adapter sets the data line of the charging interface to be operated under the UART mode.

For example, in block S11, that the adapter changes register allocations in the MCU for setting the data line of the charging interface of the adapter to be operated under the UART mode, includes that when the adapter starts the upgrading mode, the adapter sets the data line of the charging interface to be operated under the UART mode.

In detail, the adapter automatically enters the upgrading mode by setting an external condition, where the external condition can be a system presetting or a manual setting.

In block S111 of at least one embodiment, when the adapter sets the data line of the charging interface to be operated under the UART mode, the method further includes:

In block S111A, the adapter decreases an output voltage of a bus-powered VBUS line when the adapter detects an output current of the bus-powered VBUS line in the charging interface and determines that the detected output current is greater than a first threshold current; and In block S111B, the adapter sets the data line of the charging interface to be operated under the UART mode when the adapter detects the output voltage and determines that the detected output voltage is decreased to a voltage value less than a second threshold voltage, and the output current is still greater than the first threshold current.

As depicted in FIGS. 3 and 4, the converter 300 further includes a short circuit 320 configured to couple a first terminal of the short circuit 320 to a bus-powered VBUS line of a charging interface of the adapter 200, and configured to couple a second terminal of the short circuit 320 to GND, where a value of a resistor less than a first threshold resistance is disposed between the first terminal and the second terminal. It should be noted that the adapter 200 outputs a constant current corresponding to a constant output setting value while charging the smartphone. After the adapter 200 couples to the converter 300, connection between the BUS line of the charging interface of the adapter 200 and the GND line can be regarded as a short circuit 320, thereby resulting in the output current of VBUS line which exceeds the constant output setting value. Meanwhile, the adapter 200 will decrease the output voltage of VBUS line to lower the output current. If the output voltage is decreased to a predetermined threshold and the output current of VBUS line still exceeds the constant output setting value, the adapter 200 starts the upgrading mode and sets the data line of the charging interface to be operated under the UART mode. In other words, the adapter 200 is ready to receive the upgrade file in accordance with UART format transferred by the converter 300.

Therefore, the adapter automatically enters the upgrading mode by setting an external condition, such as forming a short circuit between the VBUS line and GND line. By downloading the upgrade file, which is transferred by the PC, to the MCU disposed in the adapter, the adapter can be upgraded, thereby flexibly implementing the upgrading firmware of the adapter and reducing the manufacturing cost of adapter.

In at least one embodiment, by forming a short circuit between the VBUS line and GND line of the charging interface of the adapter is a specific manner to trigger the upgrading mode of adapter. In some practical applications, different manner can be configured to trigger the upgrading mode of adapter. For example, if a control button is installed on the adapter, the control button controls the adapter to start the upgrading mode, such as a control manner of pressing, shaking or lifting the control button, when the converter couples the PC to the adapter, but not limited.

In at least one embodiment, when the converter couples the PC to the adapter, the PC controls the upgrade file to be downloaded to the MCU of the adapter. In one case, the user controls a software program of the PC to transfer the upgrade file to the adapter. In another case, after the adapter sends request information to the PC for requesting the upgrade file and the PC receives the request information, the upgrade file is downloaded from the PC to the adapter.

In block S110 of at least one embodiment, when the adapter receives the upgrade file in accordance with the UART format, which is transferred by the converter, via the data line of the charging interface of the adapter, the method further includes:

In block S113, the adapter sends a request information to the converter for requesting the upgrade file in accordance with the UART format via the data line of the adapter such that the converter transfers the request information to the PC; and In block S114, the adapter receives the upgrade file in accordance with the UART format, which is transferred by the converter, via the data line.

It should be noted that, in block S113, the request information sent from the adapter to the converter is the data in accordance with the UART format. Before the converter sends the request information to the PC, the converter converts the upgrade file in accordance with the UART format into the upgrade file in accordance with the USB format and the converter then transfers the upgrade file in accordance with the USB format to the PC.

It should also be noted that when the adapter receives the upgrade file transferred by the PC, the adapter returns the received upgrade file to the PC to allow the PC to verify the upgrade file for ensuring the accuracy of the upgrade file. After the upgrade file has been successfully verified, the upgrading firmware of the adapter is complete.

In at least one embodiment, the method 100 further includes:

In block S130, the adapter transfers the received upgrade file to the converter via the data line of the adapter such that the converter transfers the upgrade file to the PC to allow the PC to verify the upgrade file;

In block S140, the adapter receives an indication information fed back by the converter via the data line, where the PC sends the indication information to the converter for indicating that the upgrade file verification has been completed; and In block S150, the adapter exits the upgrading mode once the adapter receives the indication information.

It should be noted that after the adapter exits the upgrading mode and if a detected condition of upgrading mode is satisfied again, the adapter starts the upgrading firmware of the adapter again to receive the upgrade file transferred by PC, where the detected condition can be an output current of VBUS line greater than the constant current setting value.

In at least one embodiment, by downloading the upgrade file, which is transferred by the PC, to the MCU disposed in the adapter, the functions of MCU can be changed to adjust the operation modes of adapter for upgrading the firmware of the adapter. On the contrary, since conventional techniques may change the operation modes of adapter by replacing the hardware components of adapter, the present disclosure flexibly implements the upgrading firmware of the adapter and reduces the manufacturing cost of adapter.

Figure 2:
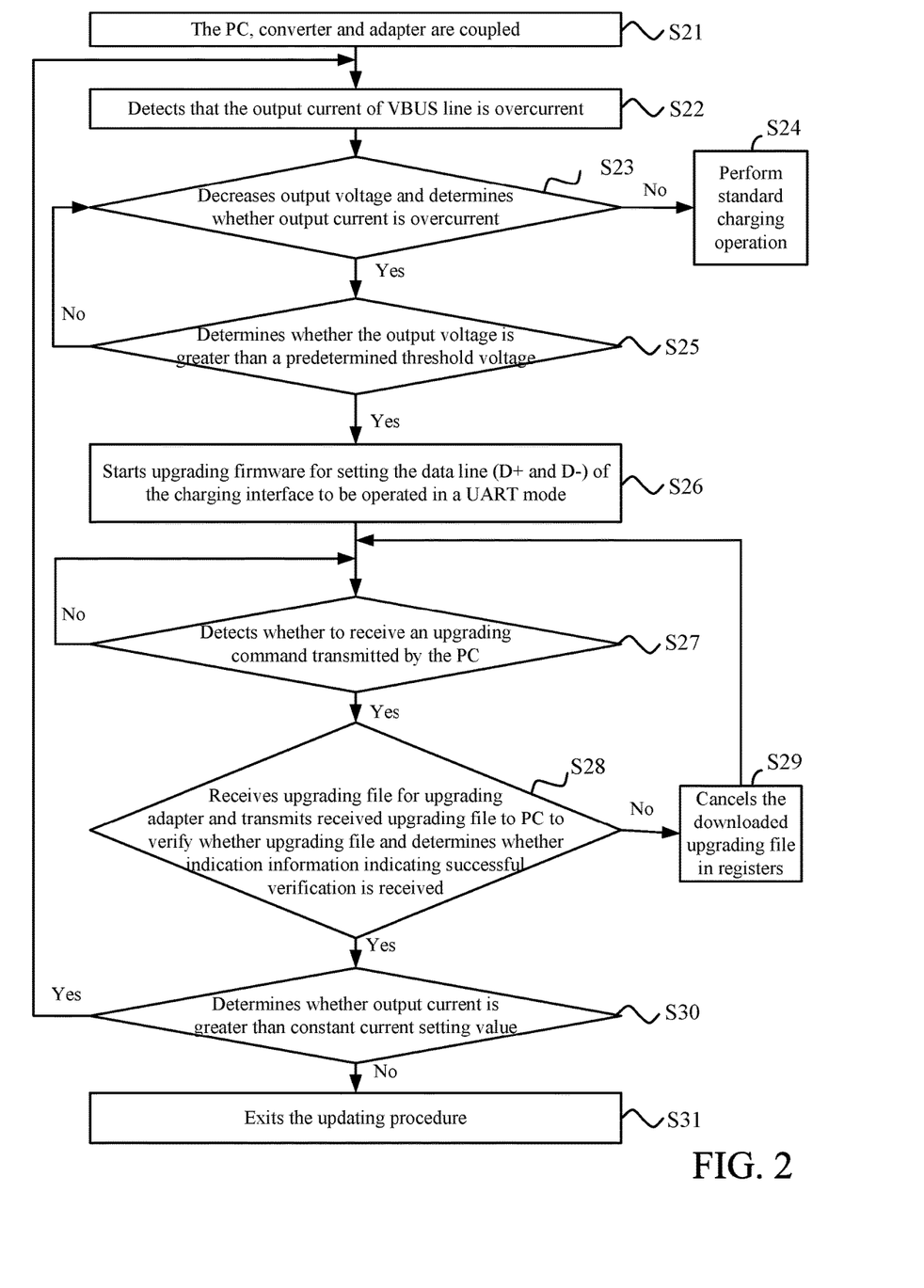
FIG. 2 is an illustrative flowchart of a method for upgrading firmware of an adapter according to another embodiment of the present disclosure.

FIG. 2 is an illustrative flowchart of a method for upgrading firmware of an adapter according to another embodiment of the present disclosure. As depicted in FIG. 2, in block S21, the PC, converter and adapter are coupled therebetween based on the arrangement of FIGS. 3 and 4. In block S22, the adapter detects that the output current of VBUS line is overcurrent. In block S23, the adapter decreases the output voltage of VBUS line and determines whether the output current of VBUS line is overcurrent. If the output current of VBUS line is overcurrent, proceed to block S25, and if the output current of VBUS line is not overcurrent, proceed to block S24. In block S24, the adapter performs a standard charging operation. In block S25, the adapter determines whether the output voltage of VBUS line is greater than a predetermined threshold. If the output voltage is greater than a predetermined threshold, proceed to block S26. If the output voltage is not greater than a predetermined threshold, return to block S23. In block S26, the adapter starts the upgrading firmware of the adapter for setting the data line (e.g., two conductive wires in accordance with signals D+ and D− respectively) of the charging interface as a UART mode. In block S27, the adapter detects whether the adapter receives an upgrading command transmitted by the PC. If the adapter receives the upgrading command, proceed to block S28. If the adapter doesn't receive the upgrading command, it is required to repeat block S27 to continuously detects whether the adapter receives the upgrading command. In block S28, the adapter receives the upgrade file transferred by the PC for upgrading the firmware of the adapter and transmits the received upgrade file to the PC to allow the PC to verify the upgrade file. The adapter determines whether the adapter receives indication information which indicates a verification of upgrade file. If the adapter does not receive the indication information, proceed to block S29. If the adapter receives the indication information, proceed to block S30. In block S29, the adapter cancels the downloaded upgrade file stored in registers and continuously return to block S27 to detect the upgrading command re-transferred by the PC. In block S30, the adapter determines whether the output current of VBUS line is greater than a constant current setting value. If the output current exceeds the constant current setting value, return to block S22 and perform the above-mentioned blocks. If the output current does not exceed the constant current setting value, the converter disconnects from the adapter and proceeds to block S31. In block S31, the adapter exits the upgrading firmware of the adapter.

FIG. 3 is an illustrative block diagram of the adapter 200 according to one embodiment of the present disclosure. The adapter 200 includes a transmitting/receiving unit 210 configured to receive an upgrade file in accordance with a UART format, which is transferred by a converter, via a data line of a charging interface of the adapter, where the converter is configured to convert the upgrade file in accordance with a USB in a PC into the upgrade file in accordance with the UART format for transmitting the upgrade file in accordance with the UART format to the adapter; and a processing unit 220 (e.g., a processor) configured to process the upgrade file in accordance with the UART format by an MCU for upgrading the firmware of the adapter when the adapter is in an upgrading mode, where the MCU is built in the adapter.

In details, the processing unit 220 is an MCU.

In at least one embodiment, by downloading the upgrade file, which is transferred by the PC, to the MCU disposed in the adapter, the functions of MCU can be changed to adjust the operation modes of adapter for upgrading the firmware of the adapter. On the contrary, since conventional techniques may change the operation modes of adapter by replacing the hardware components of adapter, the present disclosure flexibly implements the upgrading firmware of the adapter and reduces the manufacturing cost of adapter.

In at least one embodiment, the processing unit is further configured to set the data line of the charging interface as a UART mode.

The transmitting/receiving unit is further configured to receive the upgrade file in accordance with the UART format by the data line which is operated under the UART mode.

In at least one embodiment, the processing unit is further configured to decrease an output voltage of a bus-powered VBUS line when the processing unit detects an output current of the bus-powered VBUS line in the charging interface and determines that the detected output current is greater than a first threshold current; and set the data line of the charging interface to be operated under the UART mode when the processing unit detects the output voltage and determines that the output voltage decreases to a voltage value less than a second threshold voltage, and the output current is still greater than the first threshold current.

In at least one embodiment, the transmitting/receiving unit is further configured to send a request information to the converter for requesting the upgrade file in accordance with the UART format via the data line such that the converter transfers the request information to the PC; and receive the upgrade file in accordance with the UART format, which is transferred by the converter, via the data line.

In at least one embodiment, the transmitting/receiving unit is further configured to transfer the received upgrade file to the converter via the data line such that the converter transfers the upgrade file to the PC to allow the PC to verify the upgrade file, and the transmitting/receiving unit is further configured to receive an indication information fed back by the converter via the data line, where the PC sends the indication information to the converter for indicating that the upgrade file verification has been completed.

The processing unit is further configured to exit the upgrading mode of the adapter once the adapter receives the indication information.

In at least one embodiment of the present disclosure, by downloading the upgrade file, which is transferred by the PC, to the MCU disposed in the adapter, the functions of MCU can be changed to adjust the operation modes of adapter for upgrading the firmware of the adapter. On the contrary, since conventional techniques may change the operation modes of adapter by replacing the hardware components of adapter, the present disclosure flexibly implements the upgrading firmware of the adapter and reduces the manufacturing cost of adapter.

It should be noted that the adapter 200 corresponds to the adapter described in the method for upgrading firmware of the adapter and the operations and functions of units of the adapter 200 corresponds to the blocks depicted in FIGS. 1 and 2. For the sake of brevity, it will not be repeated here.

FIG. 4 is an illustrative block diagram of a converter 300 according to one embodiment of the present disclosure. The converter 300 is configured to couple a data line of a charging interface in an adapter to a USB interface of a PC, and the converter 300 includes a converting circuit 310 for converting a signal in accordance with a USB format of the PC and a signal in accordance with a UART format of the adapter therebetween.

In at least one embodiment, by downloading the upgrade file, which is transferred by the PC side, to the MCU disposed in the adapter, the functions of MCU can be changed to adjust the operation modes of adapter for upgrading the firmware of the adapter. On the contrary, since conventional techniques may change the operation modes of adapter by replacing the hardware components of adapter, the present disclosure flexibly implements the upgrading firmware of the adapter and reduces the manufacturing cost of adapter.

In at least one embodiment, the converter 300 further includes a short circuit 320 configured to couple a first terminal of the short circuit to a bus-powered VBUS line of a charging interface of the adapter. The short circuit 320 is further configured to couple a second terminal of the short circuit to a grounding line (GND), where a value of a resistor less than a first threshold resistance is disposed between the first terminal and the second terminal.

In detail, as depicted in FIG. 4, the short circuit 320 includes a circuit a serial resistor R, where two ends of the circuit are coupled to VBUS line and GND line respectively. Since the resistance of serial resistor R is small, such as 0.5 ohms or 1.0 ohm, which is equivalent to a shorting status between the VBUS line and the GND line, it causes the adapter to increase the output current to trigger the upgrading firmware of the adapter.

For example, the converter 300 includes a first interface coupling the adapter and a second interface coupling the PC, where the first interface includes data line, a terminal coupled to VBUS line of the adapter, and a terminal coupled to GND line of the adapter. The data line of first interface is configured as a UART mode for coupling data line of the adapter.

In at least one embodiment, by downloading the upgrade file, which is transferred by the PC, to the MCU disposed in the adapter, the functions of MCU can be changed to adjust the operation modes of adapter for upgrading the firmware of the adapter. On the contrary, since conventional techniques may change the operation modes of adapter by replacing the hardware components of adapter, the present disclosure flexibly implements the upgrading firmware of the adapter and reduces the manufacturing cost of adapter.

It should be noted that the converter 300 corresponds to the converter described in the method for upgrading firmware of the adapter and the operations and functions of units in the converter 300 corresponds to the blocks depicted in FIGS. 1 and 2. For the sake of brevity, it will not be repeated here.

Figure 5:
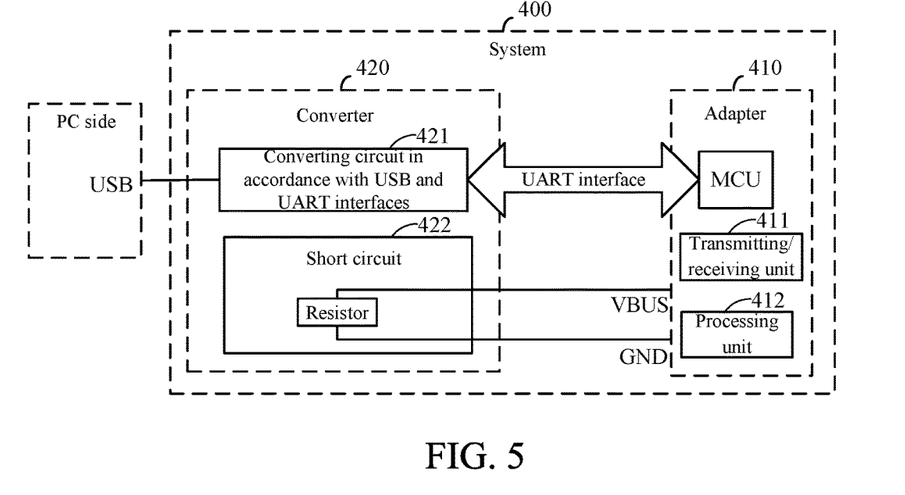
FIG. 5 is an illustrative block diagram of a system of upgrading firmware of the adapter according to one embodiment of the present disclosure.

FIG. 5 is an illustrative block diagram of a system 400 of upgrading firmware of the adapter according to one embodiment of the present disclosure. The system 400 includes the adapter 410 and the converter 420, wherein the converter 420 is configured to couple data line of a charging interface of the adapter 410 to a USB interface of a PC, and the converter 420 includes a converting circuit 421 for converting a signal in accordance with a USB format of the PC and a signal in accordance with a UART format of the adapter 420 therebetween.

The adapter 410 includes a transmitting/receiving unit 411 configured to receive upgrade file in accordance with a UART format, which is transferred by a converter, via a data line of a charging interface of the adapter. The converter is configured to convert the upgrade file in accordance with a USB format in the PC into the upgrade file in accordance with the UART format for transmitting the upgrade file in accordance with the UART format to the adapter; a processing unit 412 configured to process the upgrade file in accordance with the UART format by an MCU for upgrading the firmware of the adapter in an upgrading mode.

In at least one embodiment, by downloading the upgrade file, which is transferred by the PC, to the MCU disposed in the adapter, the functions of MCU can be changed to adjust the operation modes of adapter for upgrading the firmware of the adapter. On the contrary, since conventional techniques may change the operation modes of adapter by replacing the hardware components of adapter, the present disclosure flexibly implements the upgrading firmware of the adapter and reduces the manufacturing cost of adapter.

In at least one embodiment, the processing unit 412 is further configured to set the data line of the charging interface as a UART mode.

The transmitting/receiving unit 411 is further configured to receive the upgrade file in accordance with the UART format by the data line which is operated under the UART mode.

In at least one embodiment, the converter 420 further includes a short circuit configured to couple a first terminal of the short circuit to a bus-powered VBUS line of a charging interface of the adapter. The short circuit is configured to couple a second terminal of the short circuit to a GND line, where a value of a resistor less than a first threshold resistance is disposed between the first terminal and the second terminal.

The processing unit of the adapter is further configured to decrease an output voltage of a bus-powered VBUS line when the processing unit detects an output current of the bus-powered VBUS line of the charging interface and determined that the detected output current is greater than a first threshold current.

The processing unit of the adapter is further configured to set the data line of the charging interface to be operated under the UART mode when the processing unit detects the output voltage and determines that the output voltage decreases to a voltage value less than a second threshold voltage, and the output current is still greater than the first threshold current.

For example, the converter 300 includes a first interface coupling the adapter and a second interface coupling the PC, where the first interface includes data line, a terminal coupled to VBUS line of the adapter, and a terminal coupled to GND line of the adapter. The data line of first interface is configured to be operated under a UART mode for coupling data line of the adapter.

In at least one embodiment, the transmitting/receiving unit is further configured to send a request information to the converter for requesting the upgrade file in accordance with the UART format via the data line such that the converter transfers the request information to the PC; and to receive the upgrade file with the UART format, which is transferred by the converter, via the data line.

In at least one embodiment, the transmitting/receiving unit is further configured to transfer the received upgrade file to the converter via the data line such that the converter transfers the upgrade file to the PC to allow the PC to verify the upgrade file. The transmitting/receiving unit is further configured to receive an indication information fed back by the converter via the data line, where the PC sends the indication information to the converter for indicating that the upgrade file verification has been completed.

The processing unit is further configured to exit the upgrading mode of the adapter once the adapter receives the indication information.

In at least one embodiment, by downloading the upgrade file, which is transferred by the PC, to the MCU disposed in the adapter, the functions of MCU can be changed to adjust the operation modes of adapter for upgrading the firmware of the adapter. On the contrary, since conventional techniques may change the operation modes of adapter by replacing the hardware components of adapter, the present disclosure flexibly implements the upgrading firmware of the adapter and reduces the manufacturing cost of adapter.

It should be noted that the adapter 410 of the system 400 corresponds to the adapter described in the method for upgrading firmware of the adapter and the adapter 200, and the converter 420 of the system 400 corresponds to the converter described in the method for upgrading firmware of the adapter and the converter 300. The operations and functions of units in the system 400 correspond to the blocks depicted in FIGS. 1 and 2. For the sake of brevity, it will not be repeated here.

It should be noted that the above-mentioned embodiments of the method are depicted in a series of operations with a simplified description. However, person skilled in the art should be noted that the operations of the present disclosure are descriptive rather than limiting of the sequence of the operations because some operations can be sequentially or simultaneously performed on the basis of the functions or logics of operations.

Person skilled in the art should be noted that the components and method blocks of the disclosed embodiments of the present disclosure can be implemented by electronic hardware, computing software and the combination thereof based on conditions of application and design fields. To implement the functions thereof by hardware or software is decided by the actual technology and design used in practicing the present disclosure. Persons skilled in the art can use different designs and technologies to achieve the described functions of the components and method blocks in response to a specific condition of application and design filed. Such a use of a specially chosen technology and design to implement the functions cannot be deemed as escaping the scope of the present disclosure.

Person skilled in the art should be noted that the implement of above-mentioned system, devices and units can be referred to the methods correspondingly. For the sake of brevity and convenience, it will not be repeated here.

In some embodiments of the present disclosure, it should be noted that the described devices can be implemented by different components. For example, some embodiments of above-described devices are illustrated where the unit division is based on logical function and while implementing at least one embodiment, the unit division is basis on different ways. For example, a plurality of units or members can be combined together or integrated to another system, or some features can be ignore or are not performed. Furthermore, the above-described coupling, direct couple or communication connection statuses between interactions are implemented by interfaces. The indirect coupling or communication connection between devices or units is in electrical, mechanical or other statuses.

The separation of components is or is not a physically independent status. The display unit can be or is not a physical unit. In other words, the display unit can be disposed one place or arranged in network units. Based on requirement, a portion of units or all the units are configured to implement the technical solutions of the present disclosure.

Moreover, functional units in some embodiments of the present disclosure are integrated to a processing unit or each functional unit is installed independently.

If the above-mentioned integrated units are implemented by software functional components and serve as independent products for sale or usage, the integrated units are stored in computer readable storage media. Based on the descriptions of embodiments, person skilled in the art clearly understands that all or partial of the technical solutions of the present disclosure can be performed by software products, hardware products, firmware products and the combinations. The software products of a computer are stored in storage media and include a plurality of instructions to allow at least one computing device to execute all or partial functions of the method where the computing device is selected from a group including a personal computer, a server and network device. For example, the storage media are selected from USB disk, portable hard disk drive, Random Access Memory (RAM), Read-Only Memory (ROM), Electrically Erasable Programmable Read-Only Memory (EEPROM), Compact Disc Read-Only Memory (CD-ROM) or other kinds of disc storages, magnetic storage media or other magnetic storage device, and media of which program codes in accordance with portable stored instructions or data can be accessed by the computer to execute at least one application program for performing above-mentioned method.

As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A method for upgrading firmware of an adapter, the method comprising:
   receiving, by an adapter, an upgrade file in accordance with a Universal Asynchronous Receiver/Transmitter (UART) format, transferred by a converter, via a data line of a charging interface of the adapter, wherein the converter is configured to convert the upgrade file in accordance with a Universal Serial Bus (USB) format in a personal computer (PC) into the upgrade file in accordance with the UART format, and is configured to transmit the upgrade file in accordance with the UART format to the adapter; and
   processing, by a microcontroller unit (MCU), the upgrade file in accordance with the UART format for upgrading the firmware of the adapter when the adapter is in an upgrading mode, wherein the MCU is built in the adapter;
   wherein when receiving, by the adapter, the upgrade file in accordance with the UART format, transferred by the converter, via the data line of the charging interface of the adapter, the method further comprises: setting, by the adapter, the data line of the charging interface to be operated under a UART mode; and receiving, by the adapter, the upgrade file in accordance with the UART format by the data line which is operated under the UART mode;
   wherein when setting, by the adapter, the data line of the charging interface to be operated under the UART mode, the method further comprises: decreasing, by the adapter, an output voltage of a bus-powered VBUS line when the adapter detects an output current of the bus-powered VBUS line in the charging interface and determines that the detected output current is greater than a first threshold current and setting, by the adapter, the data line of the charging interface to be operated under the UART mode when the adapter detects the output voltage and determines that the detected output voltage decreases to a voltage value less than a second threshold voltage, and the output current is still greater than the first threshold current.

2. The method of any one of claim 1, wherein when receiving, by the adapter, the upgrade file in accordance with the UART format, which is transferred by the converter, via the data line of the charging interface of the adapter, the method further comprises:
   sending, by the adapter, a request information to the converter for requesting the upgrade file in accordance with the UART format via the data line of the adapter such that the converter transfers the request information to the PC; and
   receiving, by the adapter, the upgrade file in accordance with the UART format, transferred by the converter, via the data line.

3. The method of claim 1, wherein the method further comprises:
   resending, by the adapter, the received upgrade file to the converter via the data line of the adapter such that the converter transfers the upgrade file to the PC to allow the PC to verify the upgrade file;
   receiving, by the adapter, an indication information fed back by the converter via the data line, wherein the PC sends the indication information to the converter for indicating that the upgrade file verification has been completed; and
   exiting, by the adapter, the upgrading mode of the adapter once the adapter receives the indication information.

4. An adapter, comprising:
   a transmitting/receiving unit configured to receive an upgrade file in accordance with a UART format, which is transferred by a converter, via a data line of a charging interface of the adapter, wherein the converter is configured to convert the upgrade file in accordance with a USB in a PC into the upgrade file in accordance with the UART format, and is configured to transmit the upgrade file in accordance with the UART format to the adapter; and a processing unit configured to process the upgrade file in accordance with the UART format by an MCU for upgrading the firmware of the adapter when the adapter is in an upgrading mode, wherein the MCU is built in the adapter;

wherein the processing unit is further configured to decrease an output voltage of a bus-powered VBUS line when the processing unit detects an output current of the bus-powered VBUS line in the charging interface and determines that the detected output current is greater than a first threshold current, and to set the data line of the charging interface to be operated under a UART mode when the processing unit detects the output voltage and determines that the detected output voltage decreases to a voltage value less than a second threshold voltage, and the output current is still greater than the first threshold current; and the transmitting/receiving unit is further configured to receive the upgrade file in accordance with the UART format by the data line which is operated under the UART mode.

5. The adapter of claim 4, wherein the transmitting/receiving unit is further configured to:

send a request information to the converter for requesting the upgrade file in accordance with the UART format via the data line such that the converter transfers the request information to the PC; and receive the upgrade file in accordance with the UART format, which is transferred by the converter, via the data line.

6. The adapter of claim 4, wherein:

the transmitting/receiving unit is further configured to resend the received upgrade file to the converter via the data line such that the converter transfers the upgrade file to the PC to allow the PC to verify the upgrade file, and the transmitting/receiving unit is further configured to receive an indication information fed back by the converter via the data line, wherein the PC sends the indication information to the converter for indicating that the upgrade file verification has been completed; and the processing unit is further configured to exit the upgrading mode of the adapter once the adapter receives the indication information.

7. A system of upgrading firmware of an adapter, wherein the system comprises the adapter and a converter, and wherein:

the converter is configured to couple a data line of a charging interface in an adapter to a USB interface of a PC, and the converter comprises a converting circuit for converting a signal in accordance with a USB format of the PC and a signal in accordance with a UART format of the adapter therebetween;

the converter further comprises a short circuit configured to couple a first terminal of the short circuit to a bus-powered VBUS line of the charging interface of the adapter, and the short circuit is configured to couple a second terminal of the short circuit to a GND line, wherein a value of a resistor less than a first threshold value is disposed between the first terminal and the second terminal; and the adapter comprises:

a transmitting/receiving unit configured to receive an upgrade file in accordance with a UART format, which is transferred by the converter, via the data line of the charging interface of the adapter, wherein the converter is configured to convert the upgrade file in accordance with a USB format in a PC into the upgrade file in accordance with the UART format, and is configured to transmit the upgrade file in accordance with the UART format to the adapter; and a processing unit configured to process the upgrade file in accordance with the UART format by an MCU for upgrading the firmware of the adapter when the adapter is in an upgrading mode, wherein the MCU is built in the adapter wherein the processing unit is further configured to decrease an output voltage of the bus-powered VBUS line when the processing unit detects an output current of the bus-powered VBUS line in the charging interface and determines that the detected output current is greater than a first threshold current, and to set the data line of the charging interface to be operated under a UART mode when the processing unit detects the output voltage and determines that the detected output voltage decreases to a voltage value less than a second threshold voltage, and the output current is still greater than the first threshold current; and the transmitting/receiving unit is further configured to receive the upgrade file in accordance with the UART format by the data line which is operated under the UART mode.

8. The system of claim 7, wherein the transmitting/receiving unit is further configured to:

send a request information to the converter for requesting the upgrade file in accordance with the UART format via the data line such that the converter sends the request information to the PC; and receive the upgrade file in accordance with the UART format, which is transferred by the converter, via the data line.

9. The system of claim 7, wherein:

the transmitting/receiving unit is further configured to resend the received upgrade file to the converter via the data line such that the converter transfers the upgrade file to the PC to allow the PC to verify the upgrade file, and the transmitting/receiving unit is further configured to receive an indication information fed back by the converter via the data line, wherein the PC sends the indication information to the converter for indicating that the upgrade file verification has been completed; and the processing unit is further configured to exit the upgrading mode of the adapter once the adapter receives the indication information.

* * * * *